United States Patent
Xia (10) Patent No.: US 8,962,148 B2
(45) Date of Patent: Feb. 24, 2015

(54) LIGHTWEIGHT BRAKE ROTOR AND COMPONENTS WITH COMPOSITE MATERIALS

(75) Inventor: Houchun Xia, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/494,114

(22) Filed: Jun. 12, 2012

(65) Prior Publication Data

US 2012/0312647 A1    Dec. 13, 2012

Related U.S. Application Data

(62) Division of application No. 11/858,596, filed on Sep. 20, 2007, now Pat. No. 8,210,232.

(51) Int. Cl.
| | |
|---|---|
| *F16D 65/12* | (2006.01) |
| *B22D 19/02* | (2006.01) |
| *B22D 19/00* | (2006.01) |
| *F16D 65/02* | (2006.01) |
| *F16D 69/04* | (2006.01) |

(52) U.S. Cl.
CPC ............ *B22D 19/02* (2013.01); *B22D 19/00* (2013.01); *F16D 2065/1328* (2013.01); *F16D 2069/0491* (2013.01); *F16D 2200/0013* (2013.01); *F16D 2200/003* (2013.01); *F16D 2250/0015* (2013.01)
USPC ........... 428/579; 428/582; 428/594; 428/598; 428/609; 188/218 XL (58) Field of Classification Search
USPC .......................................... 164/111; 428/609
See application file for complete search history.

(56) References Cited

U.S. PATENT DOCUMENTS

| | | | | |
|---|---|---|---|---|
| 59,189 | A | * | 10/1866 | Cornell .......................... 164/109 |
| 60,405 | A | * | 12/1866 | Miller ............................ 428/609 |

(Continued)

FOREIGN PATENT DOCUMENTS

| | | |
|---|---|---|
| CH | 428319 A | 1/1967 |
| CN | 20051113784 A | 10/2005 |

(Continued)

OTHER PUBLICATIONS

German Office Action dated Nov. 14, 2011, Applicant No. 1 208 047 381.2, Applicant: GM Global Technology Operations LLC, 4 pages.

(Continued)

*Primary Examiner* — John J Zimmerman
(74) *Attorney, Agent, or Firm* — BrooksGroup (57) ABSTRACT

One embodiment of the invention includes a method comprising: placing a first insert and a second insert in a casting mold and wherein the first insert and second insert comprising a plurality of connecting post extending inbetween so that the first insert and second insert are in spaced-apart relationship in the mold, each of the first insert and the second insert comprising a first material; casting a molten second material into the casting mold so that the second material flows between the first insert and the second insert and solidifying the second material to provide a product comprising a cast over body portion with the first insert and second insert and so that the second material is mechanically locked or metallurgically bonded to the first material and so that one or both of the first insert and the second insert provides working surface for the product.

12 Claims, 10 Drawing Sheets

(56) References Cited

U.S. PATENT DOCUMENTS

| | | | |
|---|---|---|---|
| 974,024 A | 10/1910 | Carter | |
| 1,484,421 A | 2/1924 | Thompson | |
| 1,610,945 A * | 12/1926 | Goldsmith et al. | 428/609 |
| 1,989,211 A | 1/1935 | Norton | |
| 2,012,838 A | 8/1935 | Tilden | |
| 2,026,878 A | 1/1936 | Farr | |
| 2,255,024 A * | 9/1941 | Eksergian | 188/218 XL |
| 2,288,438 A | 6/1942 | Dach | |
| 2,603,316 A | 7/1952 | Pierce | |
| 2,756,488 A * | 7/1956 | Stevens, Jr. | 188/218 A |
| 2,862,774 A * | 12/1958 | Daub | 277/456 |
| 2,978,793 A | 4/1961 | Lamson et al. | |
| 3,005,259 A * | 10/1961 | Benya et al. | 29/505 |
| 3,007,553 A * | 11/1961 | Sinclair et al. | 188/218 R |
| 3,085,391 A | 4/1963 | Hatfield et al. | |
| 3,127,959 A | 4/1964 | Wengrowski | |
| 3,147,828 A * | 9/1964 | Hunsaker | 188/218 R |
| 3,292,746 A | 12/1966 | Robinette | |
| 3,378,115 A | 4/1968 | Stephens, III | |
| 3,425,523 A | 2/1969 | Robinette | |
| 3,433,284 A * | 3/1969 | Webbere et al. | 164/111 |
| 3,509,973 A | 5/1970 | Kimata | |
| 3,575,270 A | 4/1971 | Wagenfuhrer et al. | |
| 3,774,472 A | 11/1973 | Mitchell | |
| 3,841,448 A | 10/1974 | Norton, Jr. | |
| 3,975,894 A | 8/1976 | Suzuki | |
| 4,005,991 A * | 2/1977 | Uebayasi et al. | 428/609 |
| 4,023,613 A * | 5/1977 | Uebayasi et al. | 164/100 |
| 4,049,085 A | 9/1977 | Blunier | |
| 4,072,219 A | 2/1978 | Hahm et al. | |
| 4,154,900 A * | 5/1979 | Kaku et al. | 428/554 |
| 4,195,713 A | 4/1980 | Hagbjer et al. | |
| 4,250,950 A | 2/1981 | Buxmann et al. | |
| 4,266,638 A * | 5/1981 | Petersen et al. | 188/218 R |
| 4,278,153 A | 7/1981 | Venkatu | |
| 4,338,758 A | 7/1982 | Hagbjer | |
| 4,379,501 A | 4/1983 | Hagiwara et al. | |
| 4,475,634 A | 10/1984 | Flaim et al. | |
| 4,523,666 A | 6/1985 | Murray | |
| 4,529,079 A | 7/1985 | Albertson | |
| 4,859,541 A * | 8/1989 | Maxeiner et al. | 428/545 |
| 4,905,299 A | 2/1990 | Ferraiuolo et al. | |
| 5,004,078 A | 4/1991 | Oono et al. | |
| 5,025,547 A | 6/1991 | Sheu et al. | |
| 5,083,643 A | 1/1992 | Hummel et al. | |
| 5,115,891 A | 5/1992 | Raitzer et al. | |
| 5,139,117 A | 8/1992 | Melinat | |
| 5,143,184 A | 9/1992 | Snyder et al. | |
| 5,183,632 A | 2/1993 | Kiuchi et al. | |
| 5,184,663 A * | 2/1993 | Oono et al. | 164/98 |
| 5,259,486 A | 11/1993 | Deane | |
| 5,310,025 A | 5/1994 | Anderson | |
| 5,416,962 A | 5/1995 | Passarella | |
| 5,417,313 A | 5/1995 | Matsuzaki et al. | |
| 5,509,510 A | 4/1996 | Ihm | |
| 5,530,213 A | 6/1996 | Hartsock et al. | |
| 5,582,231 A | 12/1996 | Siak et al. | |
| 5,620,042 A * | 4/1997 | Ihm | 164/95 |
| 5,660,251 A | 8/1997 | Nishizawa et al. | |
| 5,773,783 A * | 6/1998 | Bowerman | 219/117.1 |
| 5,789,066 A | 8/1998 | Demare et al. | |
| 5,819,882 A | 10/1998 | Reynolds et al. | |
| 5,855,257 A | 1/1999 | Wickert et al. | |
| 5,862,892 A * | 1/1999 | Conley | 188/218 XL |
| 5,878,843 A | 3/1999 | Saum | |
| 5,887,684 A * | 3/1999 | Doll et al. | 188/71.1 |
| 5,927,447 A | 7/1999 | Dickerson | |
| 5,965,249 A | 10/1999 | Sutton et al. | |
| 6,047,794 A | 4/2000 | Nishizawa | |
| 6,073,735 A | 6/2000 | Botsch et al. | |
| 6,112,865 A | 9/2000 | Wickert et al. | |
| 6,206,150 B1 | 3/2001 | Hill | |
| 6,216,827 B1 | 4/2001 | Ichiba et al. | |
| 6,223,866 B1 | 5/2001 | Giacomazza | |
| 6,231,456 B1 | 5/2001 | Rennie et al. | |
| 6,241,055 B1 | 6/2001 | Daudi | |
| 6,241,056 B1 | 6/2001 | Cullen et al. | |
| 6,283,258 B1 | 9/2001 | Chen et al. | |
| 6,302,246 B1 | 10/2001 | Naumann et al. | |
| 6,357,557 B1 | 3/2002 | DiPonio | |
| 6,405,839 B1 | 6/2002 | Ballinger et al. | |
| 6,465,110 B1 | 10/2002 | Boss et al. | |
| 6,481,545 B1 | 11/2002 | Yano et al. | |
| 6,505,716 B1 | 1/2003 | Daudi et al. | |
| 6,507,716 B2 | 1/2003 | Nomura et al. | |
| 6,543,518 B1 | 4/2003 | Bend et al. | |
| 6,648,055 B1 | 11/2003 | Haug et al. | |
| 6,799,664 B1 | 10/2004 | Connolly | |
| 6,880,681 B2 | 4/2005 | Koizumi et al. | |
| 6,890,218 B2 | 5/2005 | Patwardhan et al. | |
| 6,899,158 B2 | 5/2005 | Matuura et al. | |
| 6,932,917 B2 | 8/2005 | Golden et al. | |
| 6,945,309 B2 | 9/2005 | Frait et al. | |
| 7,066,235 B2 | 6/2006 | Huang | |
| 7,112,749 B2 | 9/2006 | DiPaola et al. | |
| 7,178,795 B2 | 2/2007 | Huprikar et al. | |
| 7,293,755 B2 | 11/2007 | Miyahara et al. | |
| 7,594,568 B2 * | 9/2009 | Hanna et al. | 188/218 XL |
| 7,604,098 B2 | 10/2009 | Dessouki et al. | |
| 7,644,750 B2 | 1/2010 | Schroth et al. | |
| 7,775,332 B2 | 8/2010 | Hanna et al. | |
| 7,836,938 B2 | 11/2010 | Agarwal et al. | |
| 7,937,819 B2 | 5/2011 | Hanna et al. | |
| 7,938,378 B2 * | 5/2011 | Hanna et al. | 248/634 |
| 8,006,740 B2 * | 8/2011 | Strom | 164/98 |
| 8,210,232 B2 * | 7/2012 | Xia | 164/98 |
| 2002/0084156 A1 | 7/2002 | Ballinger et al. | |
| 2002/0104721 A1 | 8/2002 | Schaus et al. | |
| 2003/0037999 A1 | 2/2003 | Tanaka et al. | |
| 2003/0127297 A1 | 7/2003 | Smith et al. | |
| 2003/0141154 A1 | 7/2003 | Rancourt et al. | |
| 2003/0213658 A1 | 11/2003 | Baba | |
| 2004/0031581 A1 | 2/2004 | Herreid et al. | |
| 2004/0045692 A1 | 3/2004 | Redemske | |
| 2004/0074712 A1 | 4/2004 | Quaglia et al. | |
| 2004/0084260 A1 | 5/2004 | Hoyte et al. | |
| 2004/0242363 A1 | 12/2004 | Kohno et al. | |
| 2005/0011628 A1 | 1/2005 | Frait et al. | |
| 2005/0150222 A1 | 7/2005 | Kalish et al. | |
| 2005/0183909 A1 | 8/2005 | Rau, III et al. | |
| 2005/0193976 A1 | 9/2005 | Suzuki et al. | |
| 2006/0076200 A1 | 4/2006 | Dessouki et al. | |
| 2006/0243547 A1 | 11/2006 | Keller | |
| 2007/0039710 A1 | 2/2007 | Newcomb | |
| 2007/0056815 A1 | 3/2007 | Hanna et al. | |
| 2007/0062664 A1 | 3/2007 | Schroth et al. | |
| 2007/0062768 A1 * | 3/2007 | Hanna et al. | 188/218 XL |
| 2007/0142149 A1 | 6/2007 | Kleber | |
| 2007/0166425 A1 | 7/2007 | Utsugi | |
| 2007/0235270 A1 | 10/2007 | Miskinis et al. | |
| 2007/0298275 A1 * | 12/2007 | Carter et al. | 428/577 |
| 2008/0099289 A1 | 5/2008 | Hanna et al. | |
| 2008/0185249 A1 | 8/2008 | Schroth et al. | |
| 2009/0032569 A1 | 2/2009 | Sachdev et al. | |
| 2009/0107787 A1 | 4/2009 | Walker et al. | |
| 2010/0084110 A1 * | 4/2010 | Strom | 164/498 |

FOREIGN PATENT DOCUMENTS

| | | |
|---|---|---|
| CN | 1757948 | 4/2006 |
| DE | 2263654 A | 7/1974 |
| DE | 2446938 A1 | 4/1976 |
| DE | 2537038 A1 | 3/1977 |
| DE | 4321713 C2 | 8/1994 |
| DE | 69305145 12 | 4/1997 |
| DE | 19649919 C2 | 5/1999 |
| DE | 19948009 C1 | 3/2001 |
| DE | 60000008 T2 | 3/2002 |
| DE | 10141698 A1 | 3/2003 |
| DE | 60116780 T2 | 2/2006 |
| DE | 102005048258 A1 | 4/2006 |
| DE | 102006043277 A1 | 4/2007 |
| EP | 0205713 A1 | 12/1986 |
| GB | 1230274 | 4/1971 |

(56) References Cited

FOREIGN PATENT DOCUMENTS

| | | | |
|---|---|---|---|
| GB | 2024346 | * | 1/1980 |
| JP | 57154533 A | | 9/1982 |
| JP | 1126434 U1 | | 8/1989 |
| JP | 05-104567 | | 4/1993 |
| JP | 2003214465 A | | 7/2003 |
| JP | 2004011841 A | | 1/2004 |
| WO | 9823877 A1 | | 6/1998 |
| WO | 0136836 A1 | | 5/2001 |
| WO | 2007035206 A2 | | 3/2007 |
| WO | 2007040768 A2 | | 4/2007 |

OTHER PUBLICATIONS

Chinese Office Action dated May 18, 2007; Applicant No. CN200510113784.X; 19 pages.
Chinese Second Office Action dated Feb. 15, 2008; Applicant No. CN200510113784.X; 13 pages.
German Examination Report dated Oct. 22, 2007; Applicant No. DE 102005048258.9-12; 8 pages.
Gerdemann, Steven J.; Titanium Process Technologies; Advanced Material & Processes, Jul. 2001, pp. 41-43.
Mahoney, M.W. & Lynch S.P.; Friction-Stir Processing; 15 pages.
MPIF: All You Need to Know about Powder Metallurgy; http://www.mpif.org/IntroPM/intropm/asp?linkid=1; 8 pages.
Powder Metallurgy—Wikipedia article; http://en.wikipedia.org/wiki/Powder_metallurgy; 5 pages.
Sintering—Wikipedia article; http://en.wikipedia.org/wiki/Sintering; 2 pages.
Magnetorheological fluid—Wikipedia article; http://en.wikipedia.org/wiki/Magetorheological_fluid.
PCT/US2008/087354 Written Opinion and Search Report; Date of Mailing Aug. 3, 2009; 9 pages.
PCT/US2009/039839 Written Opinion and Search Report; Date of Mailing: Nov. 24, 2009; 7 pages.
PCT/US2009/048424 Written Opinion and Search Report; Date of Mailing Dec. 28, 2009, 7 pages.
International Search Report dated Apr. 2, 2007 for International Application No. PCT US06/29687, Publication No. WO 2007/040768; GM Global Technology Operations , Inc.
Omar Dessouki, George Drake, Brent Lowe. Wen Kuei Chang,General Motors Corp.:Disc Brake Squeal: Diagnoses and Prevention. 03NVC-224: Society of Automotive Engineer, Inc. 2002.
Z.Wu C. Richter .L. Menon, A Study of Anodization Process During Pore Formation in Nanoporous Alumina Templates. Journal of the Electrochemical Society, vol. 154 , 2007.
W. J. Lee, M. Alhoshan, W.H. Smyrl, Titanium Dioxide Nanotube Arrays Fabricated by Anodizing Processes, Journal of the Electrochemical Society, vol. 153 ,2006, pp. B499-B505.
I.V. Sieber. P. Schmuki , Porous Tantalum Oxide Prepared by Electrochemical Anodic, Oxidation, Journal of the Electrochemical Society, vol. 152, 2005, pp. C639-C644.
H.Tanaka, A. Shimada, A. Kinoshita, In situ Measurement of the Diameter of Nanopores in Silicon During Anodization in Hydrofluoric Acid solution, Journal of Electrochernic, 2004.
L.G. Hector, Jr., S. Sheu, Focused Energy Beam Work Roll Surface Texturing Science and Technology, Journal of Materials Processing & Manufacturing Science, vol. 2, Jul. 1993.
P.N. Anyalebechi, Ungrooved Mold surface Toporaphy Effects on Cast Subsurface Microstructure, Materials Processing Fundamentals, TMS 2007, pp. 49-62.
F.Yigit, Critical Wavelenths for Gap Nucleation in Solidification—Part 1: Theoretical Methodology, Journal of Applied Mechanics, vol. 67, Mar. 2000, pp. 66-76.
P.N. Anyalebechi, Undulatory Solid Shell Growth of Aluminum Alloy 3003 as a Function of the Wavelength of a Grooved Mold Surface Topography, TMS 2007, pp. 31-47.
German Office Action dated Apr. 22, 2014 ; Application No. 102008047381.2 ; Applicant : GM Global Technology Operations LLC ; 5 pages.

* cited by examiner

LIGHTWEIGHT BRAKE ROTOR AND COMPONENTS WITH COMPOSITE MATERIALS

TECHNICAL FIELD

The field to which the disclosure generally relates includes methods of joining different materials and products made therefrom.

BACKGROUND

Vehicles that include wheels such as, but not limited to, automobiles, trucks, buses, airplanes and the like typically include braking systems. Such braking systems commonly include drum or disc brake rotors.

SUMMARY OF EXEMPLARY EMBODIMENTS

One embodiment of the invention includes a method comprising placing a first insert and a second insert in a casting mold and wherein the first insert and second insert comprising a plurality of connecting post extending inbetween so that the first insert and second insert are in spaced-apart relationship in the mold, each of the first insert and the second insert comprising a first material; casting a molten second material into the casting mold so that the second material flows between the first insert and the second insert and solidifying the second material to provide a product comprising a cast over body portion with the first insert and second insert and so that the second material is mechanically locked or metallurgically bonded to the first material and so that one or both of the first insert and the second insert provides working surface for the product.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
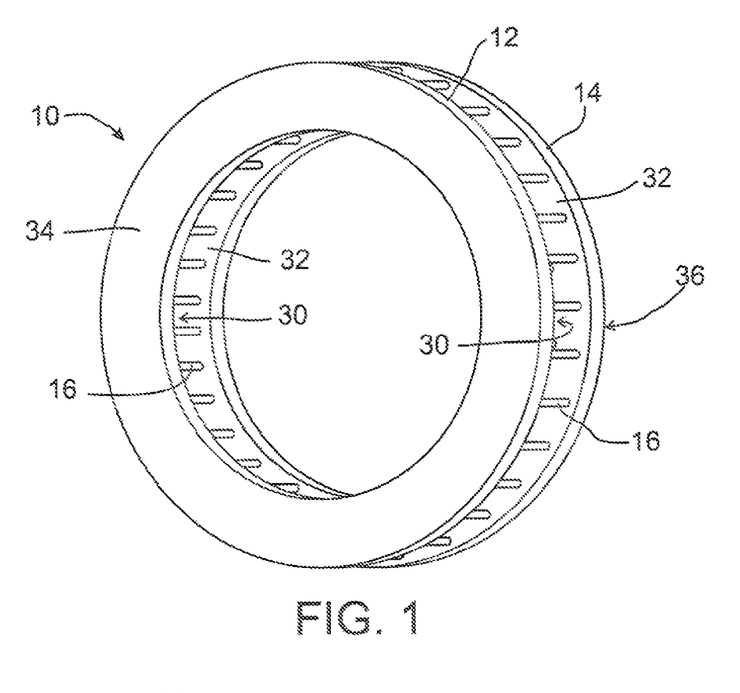
FIG. 1 illustrates a braking wheel useful in a method according to one embodiment of the invention.

Referring now to FIG. 1, one embodiment of the invention includes providing a braking wheel 10 which may include a first insert 12 and a second insert 14 which are maintained in spaced-apart relationship to each other by a plurality of post 16 extending between the first insert 12 and the second insert 14. In one embodiment, the first insert 12, the second insert 14 and the post 16 extending therebetween are cast from a single first material and are a continuous casting. The braking wheel 10 may be manufactured by casting, welding or other similar methods.

Figure 2:
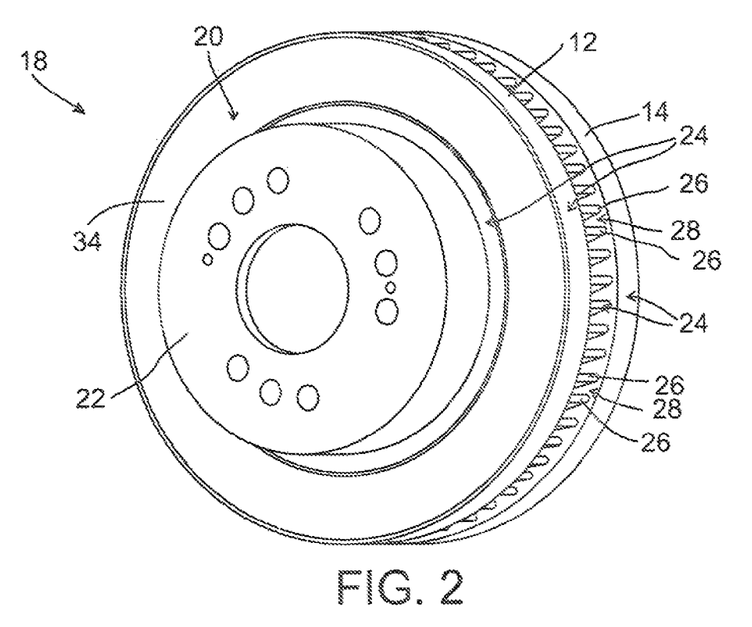
FIG. 2 illustrates a vented disc brake rotor including a braking wheel and a cast over body portion including a hub according to one embodiment of the invention.

The braking wheel 10 may be utilized to make a disc brake rotor 18 shown in FIG. 2. The disc brake rotor 18 includes a cast over body 20 including a hub portion 22 and a second portion 24 extending between the first insert 12 and the second insert 14. The second portion 24 of the cast over body 20 may cover the insert annular inner surface and the outer circumferential surfaces of the inserts 12, 14. A plurality of vanes 26 or fins extending between the first insert 12 and the second insert 14 may define a plurality of vents 28 or channels therebetween to provide a vented brake rotor as shown in FIG. 2. The vanes 26 may be straight-shaped vanes, curved vanes, pillar-type vanes or any other type vane known to those skilled in the art. In one embodiment, each of the post 16 of the brake wheel 10 may be surrounded by an associated vane 26 so that the cast over body 20 is mechanically locked to the brake wheel 10 or metallurgically bonded thereto at the post 16.

The braking wheel 10 may be made from a first material, such as cast iron to provide a first braking surface 34 on an outer face of the first insert 12 and a second braking surface 36 on an outer surface of the second insert 14. The cast over body 20 may be made of a second material that has a density and melting point less than that of the first material. In one embodiment of the invention the second material may include aluminum or alloy thereof. In one embodiment, all the exposed surfaces of the rotor comprise the second material except the two annular braking surfaces 34, 36 which comprise the first material. This arrangement prevents corrosion of the first material except at the exposed braking surfaces 34, 36. However, any corrosion at the exposed braking surfaces 34, 36 may be removed by the brake pads rubbing against the braking surfaces 34, 36.

Referring again to FIG. 1, in one embodiment, the post 16 and/or an inner surface 30 of the first insert 12 and/or an inner surface 32 of the second insert 14 may be treated, for example by applying a coating of graphite so that the inner surfaces 30, 32 and/or the post 16 is wet by the molten second material and a metallurgical bond is formed between the cast over body portion and the inserts 12, 14 or post 16.

Figure 3:
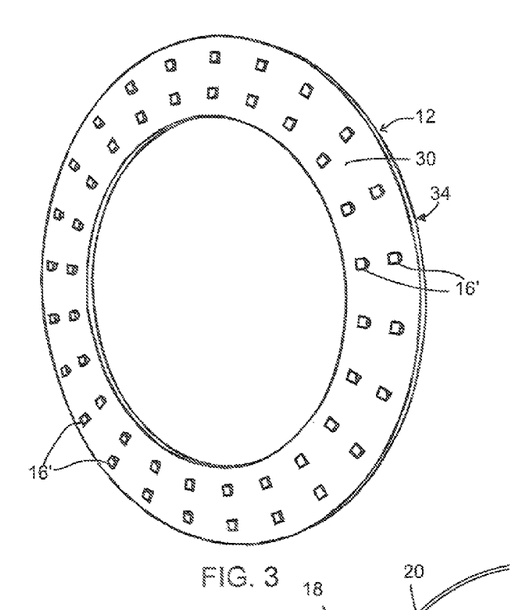
FIG. 3 illustrates an insert with projections having a trapezoidal shape useful in making an brake rotor according to one embodiment of the invention.

Referring now to FIG. 3, in one embodiment the first insert 12 (or the second insert 14) includes a plurality of trapezoid-shaped projection 16' extending from an inner surface 30 of the first insert 12 (or an inner surface 32 of the second insert 14) thereof and wherein the second material is mechanically locked to the first material at the projections during a casting process. At least one of the outer surface 34 of the first insert 12 (or the outer surface 36 of the second insert 14) provides a first braking surface. Still other embodiment of annular disc inserts with projections 16' are illustrates in FIGS. 16, 18 and 19.

Figure 4:
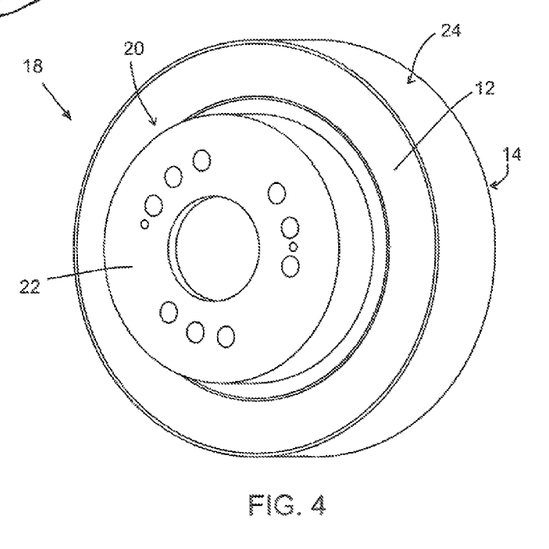
FIG. 4 illustrates a non-vented disc brake rotor including a braking wheel and a cast over body portion including a hub according to one embodiment of the invention.

Referring now to FIG. 4, alternatively, the second portion 24 of the cast over body 20 may completely fill the space between the first insert 12 and the second insert 14 to provide a solid non-vented disc brake rotor 18.

Figure 5:
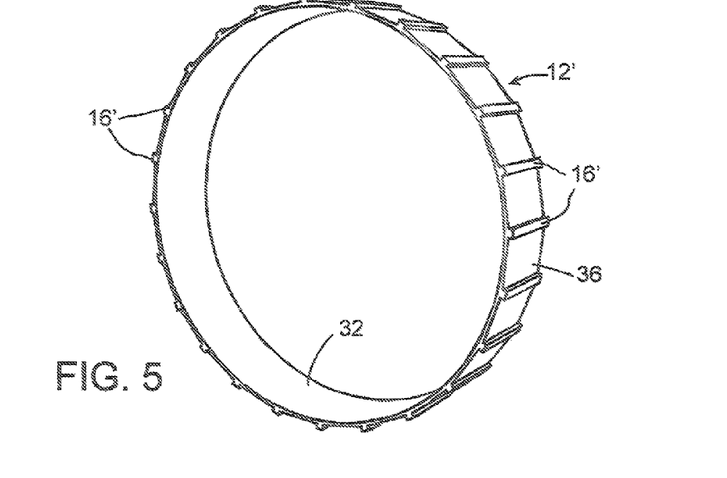
FIG. 5 illustrates a braking wheel for a drum rotor useful in a method according to one embodiment of the invention.
Figure 16:
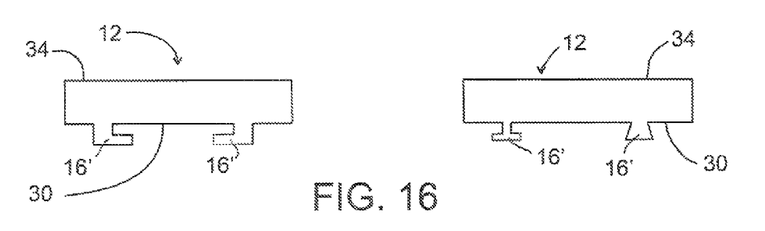
FIG. 16 is a sectional, side view of an annular disc insert including a plurality of projections which may have a trapezoid-shape, L-shape or T-shape that is useful according to one embodiment of the invention.

Referring now to FIG. 5, in another embodiment of the invention, the brake wheel 10 may be constructed and arranged to form a cylindrical inner wall with projections 16' extending from an outer surface 36. In one embodiment the projection 16' may have a trapezoid-shape, T-shape, L-shape, rectangular-shape and the like. Some examples of the designs for the projections 16' are shown in FIG. 16. An inner face 32 of the cylindrical wall provides a braking surface.

Figure 6:
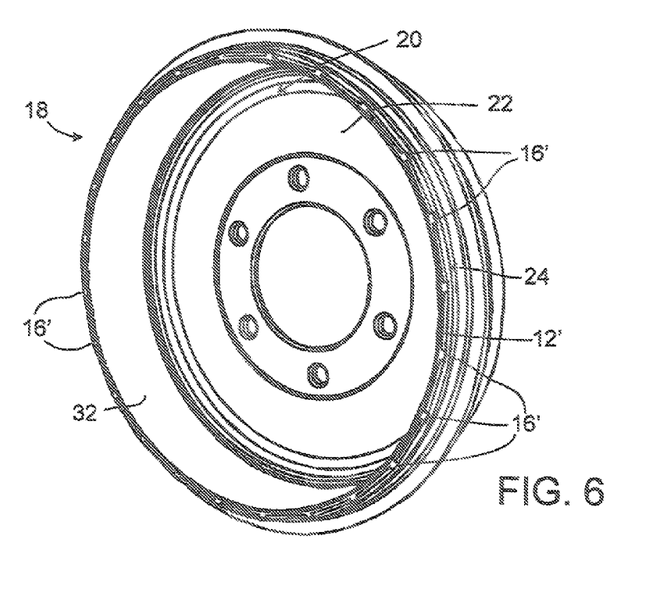
FIG. 6 illustrates a drum rotor including a braking wheel, and cast over body portion including a hub according to one embodiment of the invention.

Referring now to FIG. 6, the brake wheel 10 of FIG. 5 may be utilized to provide a cast over body 20 defining a hub portion 22 and a second portion 24 to completely cover all the projections 16' on the braking wheel 10 to provide a drum brake rotor 18.

Figure 7:
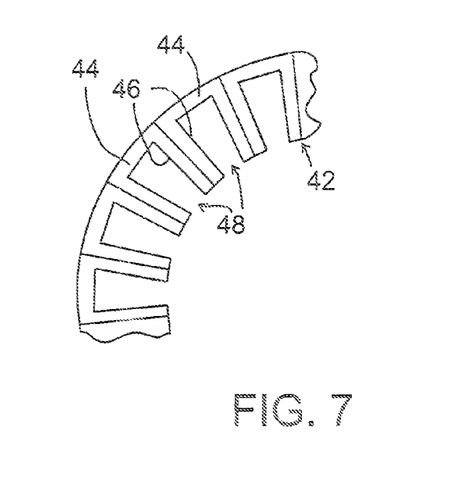
FIG. 7 illustrates a sectioned core insert useful in making a disc brake rotor according to one embodiment of the invention.

Referring now to FIG. 7, a casting core 42 may be utilized to make a vented disc brake rotor shown in FIG. 2. The casting core 42 may be a permanent metal core. In one embodiment the core 42 may be sectioned into many pieces each of which may be slid between the first insert 12 and second insert 14 from a position associated with the outer diameter of the brake wheel 10 towards the center thereof. Each portion 44 of the core 42 may include at least one slot 46 formed therein having an open end 48 to receive the post 16 extending between the first insert 12 and the second insert 14.

Figure 8:
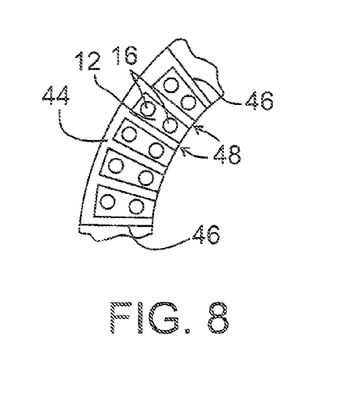
FIG. 8 illustrates a sectional plan view of a sectioned casting core overlying a portion of a braking wheel including an annular disc and post extending therefrom and wherein the post received in slots formed in the casting core according to one embodiment of the invention.

FIG. 8 is a sectional, planer view of a braking wheel 10 including a first insert 12 and a plurality of post 16 extending upwardly therefrom and portions 44 of a core 42 overlying the first insert 12. During the casting operations, the slots 46 formed in each portion 44 of the core 42 will, be filled with the second material to form vanes 26 extending between the first insert 12 and the second insert 14. The vane 26 may capture the post 16 or projections 16' and be mechanically locked thereto or the posts or projections may be treated so that the second material used to form the vane 26 is metallurgically bonded to the post 16 or projection 16'. The core 42 may then be removed to leave vents 28 or channels between vanes 26.

Figure 9:
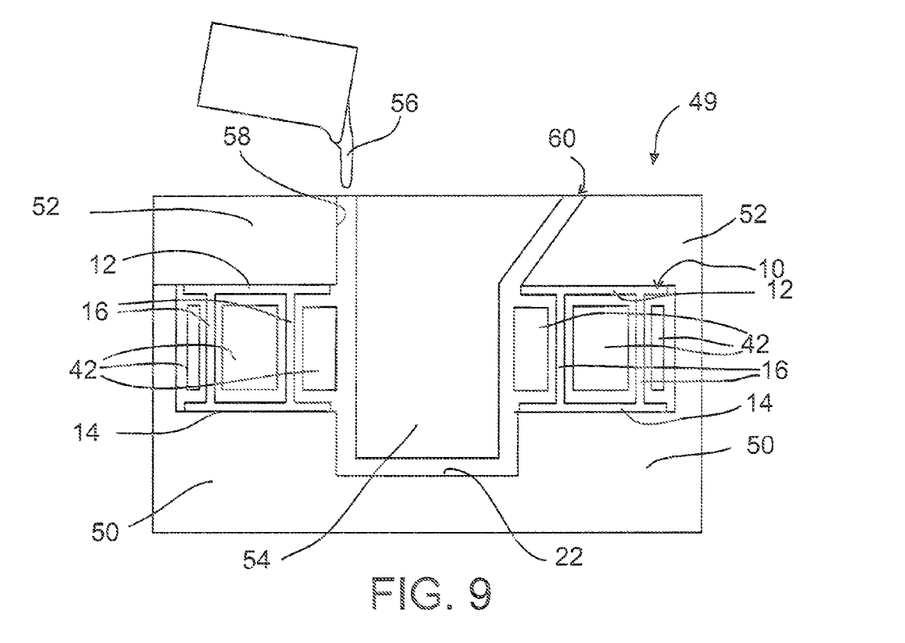
FIG. 9 illustrates a method of making a disc brake rotor according to one embodiment of the invention.
Figure 10:
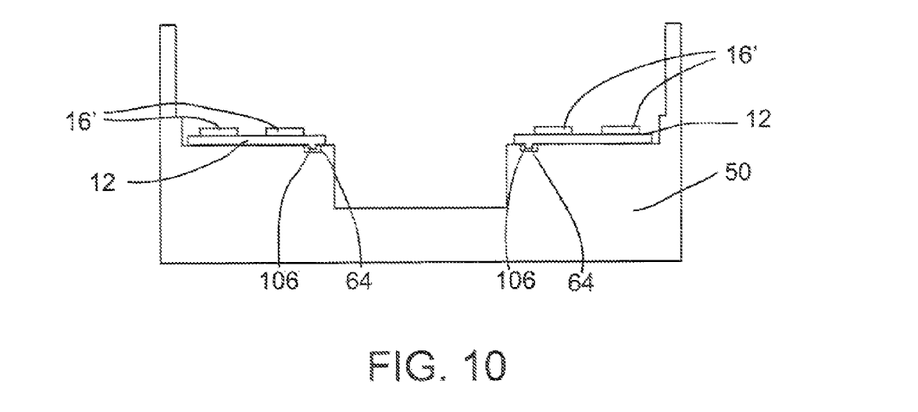
FIG. 10 illustrates placing a first annular disc insert in a casting mold in a method of making a brake rotor according to one embodiment of the invention.

Referring now to FIG. 9, one embodiment of the invention includes placing a braking wheel. 10 and including a core 42 into at least one of a first portion 50 of a casting mold 49 or second portion 52 of a casting mold wherein the second portion 52 includes a projection 54 constructed and arranged to extend into the first portion 50 of a casting mold 49 to define the hub 22 of the brake rotor. The casting mold 49 may be a permanent metal mold. The material utilized for the braking wheel may be a first material such as cast iron and a second molten material 56 may be poured into the casting mold through a charge line 58. The second molten material 56 may be of a second material such as aluminum which has a lower melting point and is lighter than the first material. The casting mold 49 may include a vent 60 and other features known to those skilled in the art.

Figure 11:
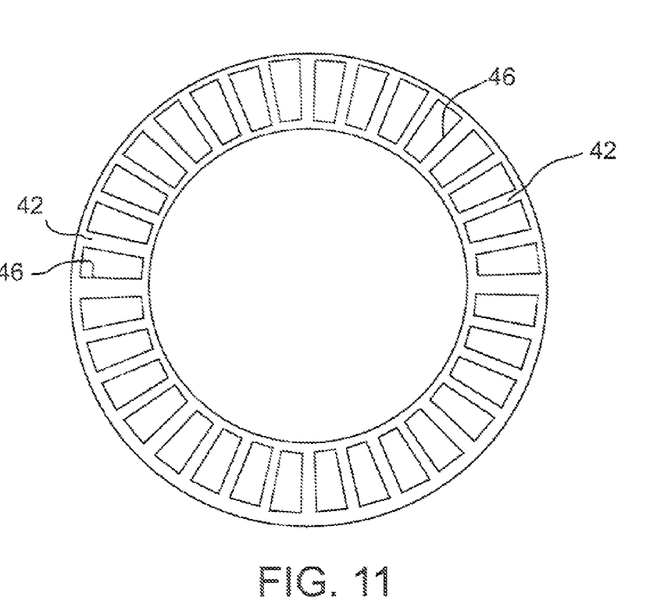
FIG. 11 illustrates a casting core including a plurality of channels formed therein for use in a method according to one embodiment of the invention.
Figure 12:
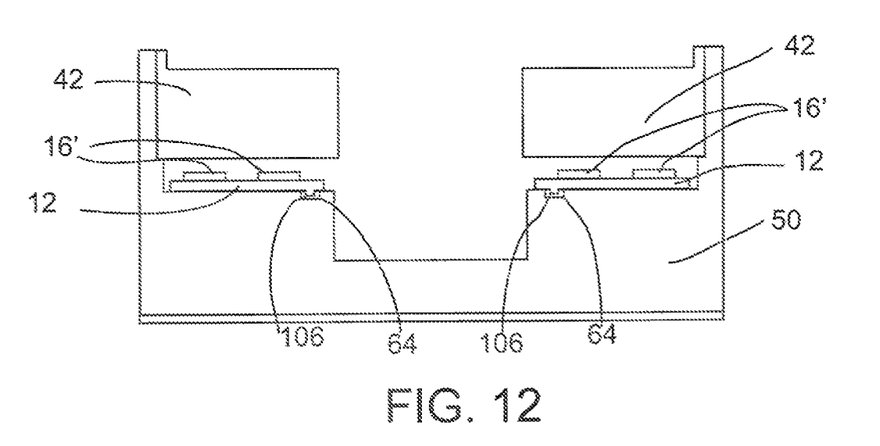
FIG. 12 illustrates a method of placing the casting core of FIG. 10 in a casting mold according to one embodiment of the invention.
Figure 13:
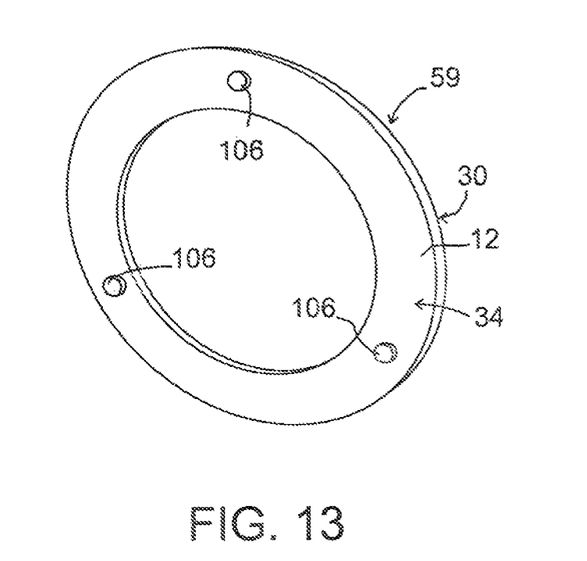
FIG. 13 illustrates an annular disc insert including locating features useful in a method according to one embodiment of the invention.
Figure 14:
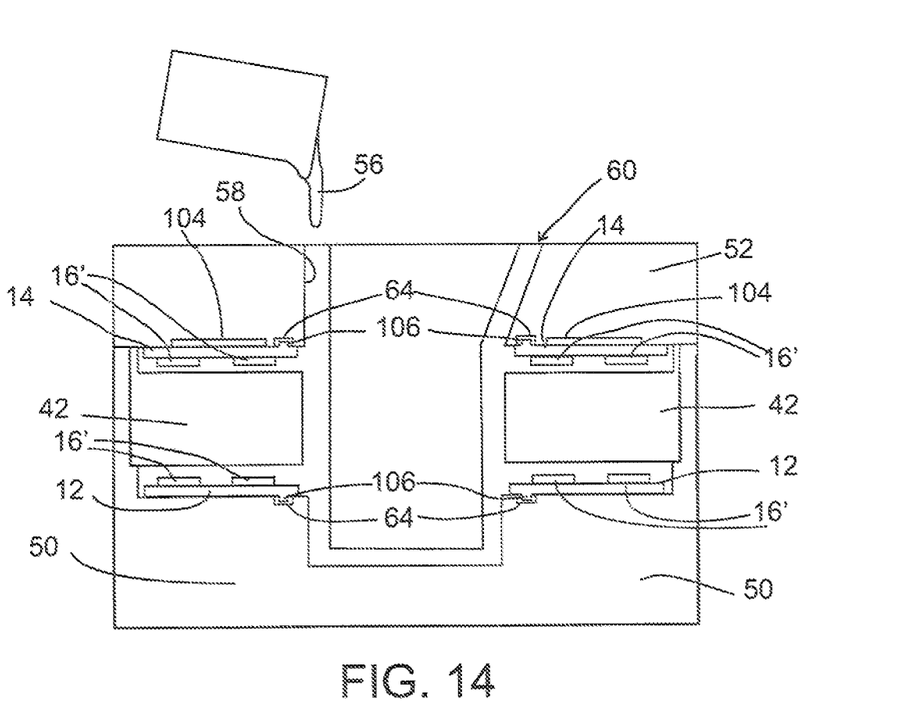
FIG. 14 illustrates a method of closing the casting mold and pouring molten material into the mold according to one embodiment of the invention.

FIGS. 10-14 illustrate another embodiment of making a brake rotor. The first insert 12 may be a separate annular disc 12 with trapezoidal projections 16' as shown in FIG. 16 and placed in the first portion of a casting, mold 50. Thereafter, a casting core 42 may be placed over the first insert 12 (as shown in FIG. 12). The core 42 as shown in FIG. 11 may be a single intact piece including a plurality of channels 46 formed therein and constructed and arranged to produce vanes 26 during the casting process. FIG. 13 illustrates one embodiment of the invention in which the first insert 12 or the second insert 14 may include an annular disc portion 59 with locating features 106 on the braking surfaces 34, 36. As shown in FIG. 14, in one embodiment each of the first portion 50 and second portion 52 of the casting mold 49 may include the locating features 64 working together with the locating features 106 on the inserts to hold the inserts in place in the mold for casting. For example a plurality of recesses 64 formed therein to receive the locating features 106 so that each of the first insert 12 and second insert 14 may be held in a designed position. In another embodiments the second portion 52 of the casting mold 49 may include a magnet 104 to hold the second insert 14 and then be placed over the first portion 50 to close the mold 49, and the molten second material 56 may then be poured in through a charge line 58 to form a brake rotor having a cast over body 20 including a hub 22 and a second portion 24 (not shown) extending between the first insert 12 and the second insert 14. The locating features 106 on the first insert 12 and the second insert 14 may be machined off later. The locating features 106 may also be constructed to rest on the shoulder of a specially designed mold and may be clamped onto by the mold halves. To make a non-vented disc brake rotor the core 42 is not used.

Figure 15:
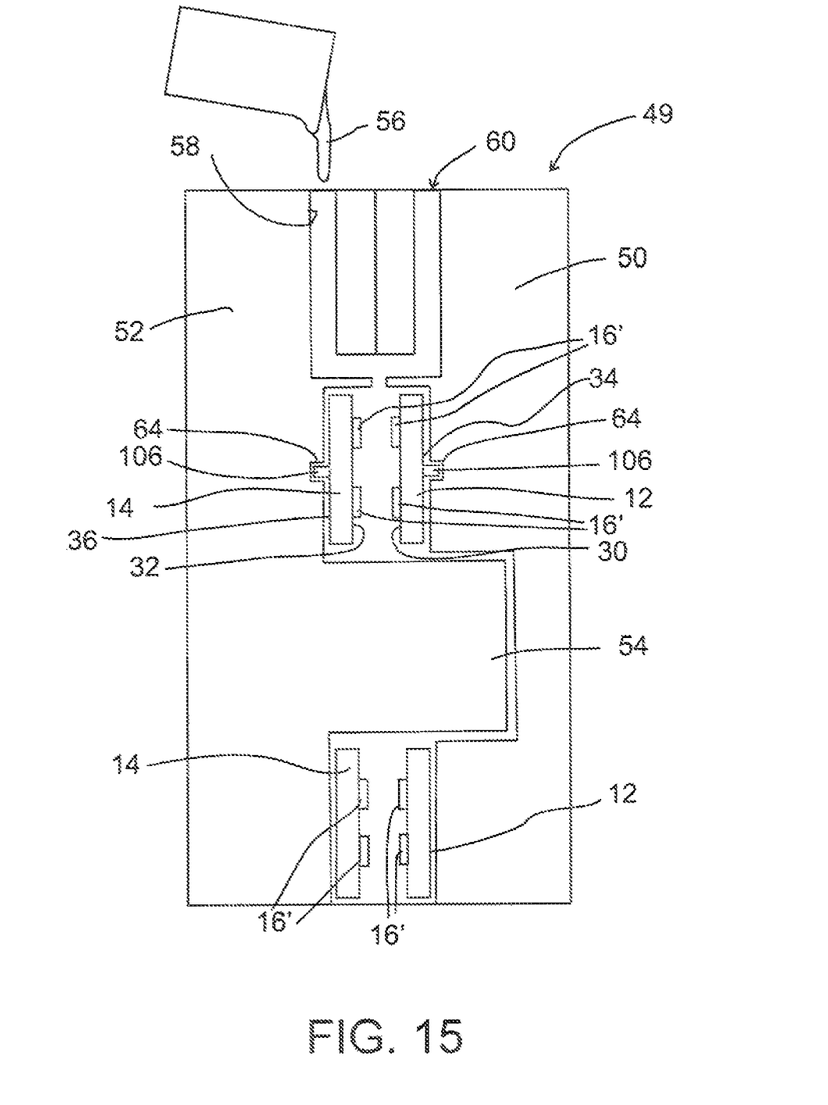
FIG. 15 illustrates a vertical casting method including placing the first and second annular disc insert with locating feature in first and second mold halves respectively, and pouring molten material into the casting mold according to one embodiment of the invention.

Referring now to FIG. 15, in another embodiment each of the first, insert 12 and second insert 14 may be held in a vertical position. Molten material 56 may be poured into the casting mold 49 to provide a rotor including a cast over body portion 20 including a hub portion 22 and a second portion 24 extending between the first insert 12 and the second insert 14, for example as shown in FIG. 4.

FIG. 16 illustrates one embodiment of a first insert 12 (or second insert 14) including a plurality of projection 16' extending outwardly from a inner surface 30 of the first insert 12. The first insert 12 may include an outer first braking surface 34. The projections 16' may be constructed and arranged so that a mechanical lock is provided when the second material is cast into the casting mold. The projections 16' may have any of a variety of shapes. For example, the projection 16' may be trapezoid-shaped, L-shaped, T-shaped or may have any shape providing a shoulder or surface against which the second material may be trapped and thereby preventing the first insert 12 (or second insert 14) from being pulled away from the second portion 24 of the cast over body 20.

Figure 17A:
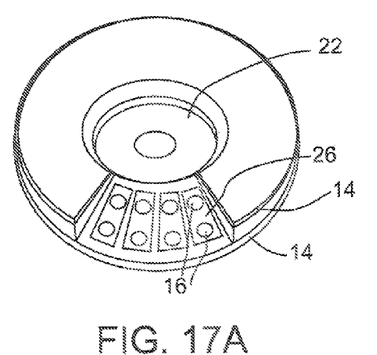
FIG. 17A is a perspective view with portions broken away of a brake rotor with straight vanes according to one embodiment of the invention.
Figure 17B:
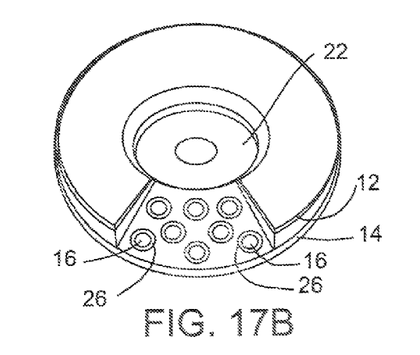
FIG. 17B is a perspective view with portions broken away of a brake rotor with pillar-type vanes according to another embodiment of the invention.
Figure 17C:
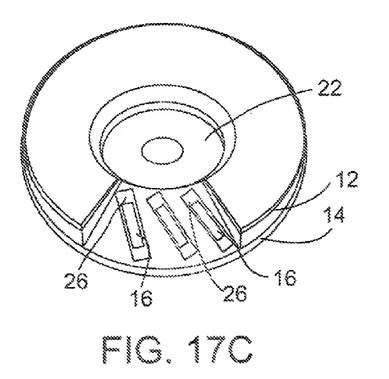
FIG. 17C is a perspective view with portions broken away of a brake rotor with straight, tangential vanes according to another embodiment of the invention.
Figure 17D:
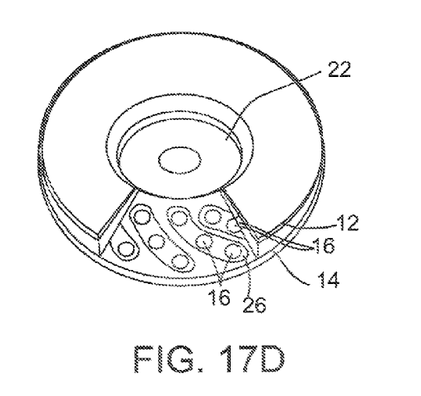
FIG. 17D is a perspective view with portions broken away of a brake rotor with curved, tangential vanes according to another embodiment of the invention.

FIG. 17A is a perspective view with portions broken away of a brake rotor according to one embodiment of the invention which includes straight vanes 26 with individual post 16 trapped therein. FIG. 17B is a perspective view with portions broken away of a brake rotor according to another embodiment of the invention of a pillar-type design. FIG. 17C is a perspective view with portions broken away of a brake rotor according to another embodiment of the invention including tangential, straight aluminum vanes 26 with vane-shaped cast iron post 16 trapped inside the aluminum vanes 26. FIG. 17D is a perspective view with portions broken away of a brake rotor according to another embodiment of the invention including tangential, curved aluminum vanes 26 with individual cast iron post 16 trapped inside the vanes 26.

Figure 18:
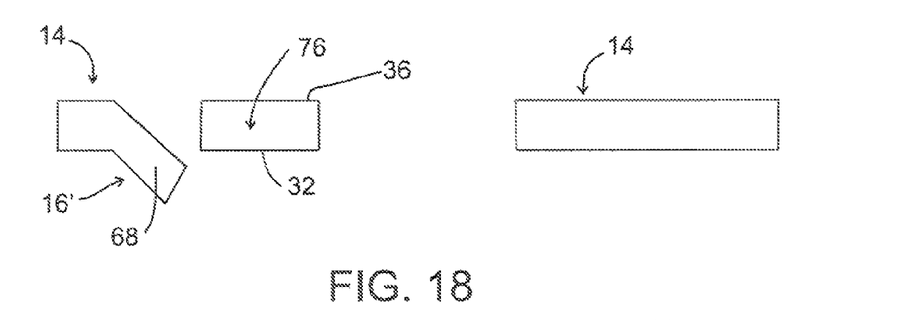
FIG. 18 is a sectional, side view of an annular insert including downwardly extending legs stamped out of the insert and useful in a method according to one embodiment of the invention.

FIG. 18 illustrates another embodiment of the invention including an insert 14 which includes a plurality of projections 16' which may be formed by stamping a downwardly extending leg portion 68 out of the insert such as stainless steel or other material suitable for stamping.

Figure 19:
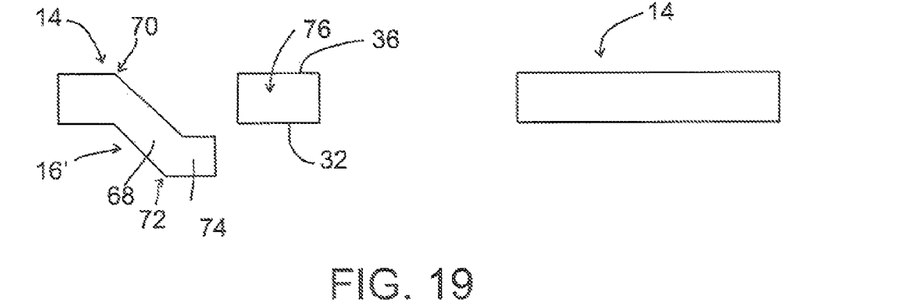
FIG. 19 illustrates a sectional, side view of an annular insert including a tab stamped out of the insert including a downwardly extending leg portion and a foot useful intone embodiment of the invention.

As shown in FIG. 19, the projection 16' may include a first bend 70 and second bend 72 therein to define a leg portion 68 and a foot portion 72 which may be substantially parallel to the main body portion 76 of the insert 14. In one embodiment, the projection 16' may be stamped out of the main body portion 76 of the insert 14 at a location that is not in use.

Various embodiments of the invention may include any design features as that in traditional brake rotor designs, e.g., cross drilled holes or other machined features on the rotor surface, as well as coatings or heat treatment of rotor surfaces and the like. Various surface treatments may be performed on the first insert 12, second insert 14 and projections 16' or post 16 to improve the brake and/or rotor performance.

According to various illustrative embodiments of the invention, frictional damping may be achieved by the movement of the interfacing surfaces of the first material and the second material against each other.

One embodiment of the invention includes a product which may have a frictional damping means. In embodiments wherein at least a portion of at least one of inner faces 30, 32 of the inserts 12, 14 respectively, or the post 16 may be coated with a material to product frictional damping. The coating may include fibers or particles that resist flowing when exposed to the temperature of a molten material such as in casting.

The above description of embodiments of the invention is merely exemplary in nature and, thus, variations thereof are not to be regarded as a departure from the spirit and scope of the invention.

What is claimed is:

1. A product comprising:
   a braking wheel comprising a first insert and a second insert in spaced-apart relationship, each of the first insert and the second insert comprising a first material;
   a cast over body portion comprising a second material-wherein the second material is provided between the first insert and the second insert and wherein that the second material is mechanically locked or metallurgically bonded to the first material and so that one or both of the first insert and the second insert provides braking surface(s) for the product, wherein each of the first insert and the second insert includes a plurality of projections extending from an inner face thereof, and wherein the second material is mechanically locked to the first material at the projections, and wherein at least one of the projections is trapezoid-shaped, T-shaped, or L-shaped, and wherein the first insert or second insert and the projections are a single continuous workpiece; and
   a sectioned annular casting core.

2. A product as set forth in claim 1 further comprising a plurality of posts extending between and permanently connecting the first insert and the second insert and wherein the second material surrounds each post and wherein the second material is mechanically locked to the first material at the posts, and wherein the post inbetween and connecting the inserts is in the shape of round rods, rectangular bars, or curved fins and wherein the first insert and the second insert and the plurality of post are a single continuous workpiece.

3. A product as set forth in claim 1 wherein the first insert comprises a first annular brake disc and wherein the second insert comprises a second annular brake disc and wherein a first braking surface is provided by an outer surface of the first insert, and further comprising a second braking surface provided by an outer surface of the second insert.

4. The product as set forth in claim 1, further comprising a sectioned annular casting core comprising a plurality of core sections, wherein the core has slots formed therein each with an opened end and the core is placed between the first insert and the second insert prior to casting, and wherein an associated post is received in the slot through the open end, wherein the core can be removed to provide vanes extending between the first insert and the second insert where the slots in the core were and to provide vent channels between the vanes, and wherein a permanent mold and a permanent core may be used to cast the second material.

5. The product as set forth in claim 1, wherein the plurality of projections are formed by stamping a downwardly extending leg portion of the insert.

6. The product as set forth in claim 1, wherein the plurality of projections include a first bend and a second bend to define a leg portion and a foot portion which is substantially parallel to the first and second inserts.

7. A product comprising:
   a drum brake rotor comprising a first cylindrical insert comprising an inner surface and an outer surface, wherein a plurality of projections extend from the outer surface thereof and wherein the inner surface provides a braking surface, the first cylindrical insert comprising a first material;

a cast over body portion comprising a second material and wherein the second material is mechanically locked to the plurality of projections, wherein at least one of the projections is trapezoid-shaped, T-shaped, or L-shaped, and wherein the first cylindrical insert and the projections are a single continuous workpiece; and a sectioned annular casting core comprising a plurality of core sections, wherein the core has slots formed therein each with an opened end and the core is placed between the first insert and the second insert prior to casting, and wherein an associated post is received in the slot through the open end.

8. A product as set forth in claim 7 further comprising providing a coating on the inner surface of the first cylindrical insert to provide frictional damping, the coating comprising fibers or particles that resist flowing when exposed to the temperature of a molten second material.

9. The product as set forth in claim 7, wherein the core can be removed to provide vanes extending between the first insert and the second insert where the slots in the core were and to provide vent channels between the vanes.

10. A product comprising a brake drum comprising:

a first cylindrical insert comprising an inner surface and an outer surface, wherein the inner surface comprises a braking surface, and wherein the first cylindrical insert comprises a first material; a cast over body portion comprising a second material and wherein that the second material is mechanically locked or metallurgically bonded to the first material; and a sectioned annular casting core comprising a plurality of core sections, wherein the core can be removed to provide vanes extending between the first insert and the second insert and to provide vent channels between the vanes.

11. A product as set forth in claim 10 wherein a plurality of projections extend outward from the outer surface.

12. A product as set forth in claim 11 wherein at least one of the projections is trapezoid-shaped, T-shaped, L-shaped, or rectangular shaped and wherein the first cylindrical insert and the projections are a single continuous workpiece.

\* \* \* \* \*